United States Patent [19]

Kragness et al.

[11] Patent Number: 5,264,304
[45] Date of Patent: Nov. 23, 1993

[54] BATTERY SEPARATORS WITH T-SHAPED RIBS

[75] Inventors: Eric D. Kragness, Mt. Airy; Joseph T. Lundquist, Jessup, both of Md.

[73] Assignee: W. R. Grace & Co.-Conn., New York, N.Y.

[21] Appl. No.: 764,252

[22] Filed: Sep. 23, 1991

[51] Int. Cl.⁵ .............................................. H01M 2/16
[52] U.S. Cl. ................... 429/143; 429/146; 429/147
[58] Field of Search ..................... 429/143, 146, 147

[56] References Cited

U.S. PATENT DOCUMENTS

| | | | |
|---|---|---|---|
| 3,917,772 | 11/1975 | Hollenbeck | 429/146 |
| 4,000,352 | 12/1976 | Hollenbeck et al. | 429/147 |
| 4,024,323 | 5/1977 | Versteegh | 429/249 |
| 4,490,447 | 12/1984 | Battersby | 429/143 |

FOREIGN PATENT DOCUMENTS

| | | | |
|---|---|---|---|
| 549296 | 7/1956 | Belgium | 429/146 |
| 531259 | 7/1955 | Italy | 429/143 |

Primary Examiner—Prince Willis, Jr.
Assistant Examiner—M. Nuzzolillo
Attorney, Agent, or Firm—Howard J. Troffkin

[57] ABSTRACT

A sheet product useful as a battery separator in the form of a microporous base sheet having spaced T-shaped (cross-sectional) ribs extending from one surface of the base sheet.

26 Claims, 1 Drawing Sheet

5,264,304

BATTERY SEPARATORS WITH T-SHAPED RIBS

BACKGROUND OF THE INVENTION

The present invention is directed to an improved sheet product useful as a battery separator and to a method of forming the product. Specifically, the improved battery separator is composed of a base sheet having spaced ribs or projections of a T-shaped configuration extending from one surface of the sheet.

Electrochemical cells and batteries are composed of at least one pair of electrodes of opposite polarity and, in general, have a series of adjacent electrodes of alternating polarity. The current flow between electrodes is maintained by an electrolyte which may be acidic, alkaline or neutral depending on the nature of the battery. Between adjacent electrodes of opposite polarity is located a separator to prevent their contact while freely permitting electrolytic conduction. Separators have taken many configurations. In modern battery design, the separator is in the form of a thin sheet or film or, more preferably, a thin envelope surrounding each electrode of one polarity.

The battery separator is a critical element in the battery design. The separator is preferably of a sheet capable of completely separating opposite polarity electrodes. In addition, the sheet should be of a thin and highly porous characteristic to provide a battery of high energy density. Further, in acid batteries (e.g. lead-acid) for which the present sheet product is most suitable as an improved separator, the separator should be of a design which permits the removal of gaseous by-products and which aids in maintaining the electrode plates in stable position. To this end, sheet products having spaced ribs (U.S. Pat. No. 3,917,772; 3,798,294; and 4,037,030) or multiple protrusions (U.S. Pat. No. 4,000,352) have been suggested. Because of the very thin and highly porous characteristics desired in separator design, ribs tend to lack the ability to hold the plates in position and protrusions tend to collapse. Further, conventional envelope or pocket-type separators tend to collapse or crimp during the insertion of an electrode plate (known as "blocking") during battery assembly and, thereby, require extra inspection and assembly time to assure that all plates are fully inserted.

It is highly desired to have a separator which has the ability to provide a more rigid configuration, while maintaining its thin, porous character, is capable of providing and maintaining egress means for gaseous by-products, has the capability of enhancing electrode plate positioning over the life of the battery operation, and aids and improves the ease of battery assembly.

SUMMARY OF THE INVENTION

The present invention provides a thin, microporous sheet product having projections in the form of spaced ribs extending from one surface of the sheet product. The improvement comprises that the projections are of a T-shaped configuration; that is, that the projections extend from one of the sheet's surfaces substantially perpendicular and that the extended end of each projection provides a body which is substantially parallel to said sheet's surface.

DETAILED DESCRIPTION

Figure 1:
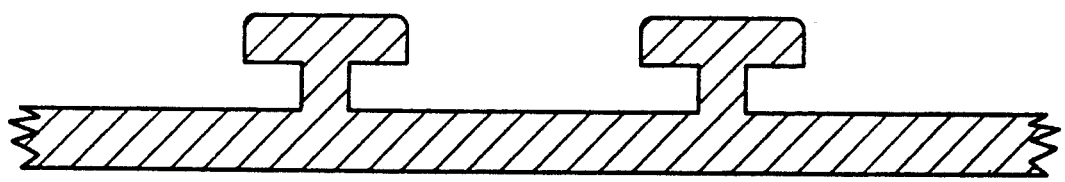
FIG. 1 is a schematic cross-sectional view of a portion of the subject sheet product with T-shaped projections according to the present invention.

The present invention is directed to a sheet product having spaced T-shaped ribs projecting from one surface, as more fully described herein below, and to a process of forming same.

The term "sheet" as used herein and in the appended claims refers to an initially provided product composed of a base sheet having first and second major surfaces with spaced projections extending from one major surface of the base sheet. The area between adjacent spaced projections may be substantially flat land areas. The sheet may be provided as a porous base sheet with a non-porous projections of thermoplastic composition or the base sheet and projections can both be of such a composition. The projections are substantially linear (in cross-section) and perpendicular to the base sheet.

The term "sheet product" as used herein and in the appended claims refers to a product of the present invention wherein the projections of the above-defined sheet has been transformed into T-shaped projections and the body has been made porous. The sheet product provides an improved battery separator.

Battery separators have been formed in the past from a variety of materials. The present invention is directed to the use of compositions which contain at least one component of the initial composition which is capable of being extracted from the composition after formation of the T-shaped rib projections. Such compositions are disclosed in detail in U.S. Pat. Nos. 3,351,495, and 4,024,323, the teachings of which are incorporated herein by reference. For example, initial compositions useful in forming the present sheet product may be composed of a polymeric binder, a filler and at least one component capable of being readily removed from the initial composition such as by extraction, evaporation, or the like. Although the preferred embodiment (as described below) provides for using the initial composition to form a sheet which has spaced ribbed projections as an integrally formed element, the sheet may be formed from a preformed microporous (having average pore diameter of from about 0.005 to 100 microns) sheet to which a composition is applied to one surface to provide spaced projections. In the embodiment where the ribs are applied to the sheet, the rib forming composition should be of the character that it is adherent to the substrate base sheet, is thermoplastic and, preferably, is capable of being made porous, such as by extraction, or the like, subsequent to being formed into the desired shape, as described below.

The polymeric component useful in forming the sheet product (or the rib portion thereof) can be selected from thermoplastic polymers, such as polyolefins as, for example, polyethylene, polypropylene and the like; polysulfones as, for example, polyarylether sulfone and the like; polyvinyl halide as, for example, polyvinyl chloride and the like; polyacrylic acid and esters thereof as, for example, polymethacrylic acid, polymethyl methacrylate and the like; as well as mixtures thereof. The polymeric component may include a combination of polymer suitable as binder for the sheet product and polymer which is removable to provide porosity to the resultant sheet product. The polymeric component contemplated for use as part of the final sheet product should be substantially inert with respect to the battery environment it will be used in. All of the above polymers are inert with respect to acid environment.

The filler component useful in forming the sheet product can be water soluble or water insoluble materials. The fillers include, for example, metal oxides, and hydroxides, such as those of silicon, calcium, magnesium, titanium, etc.; metal carbonates, such as those of calcium, magnesium, etc.; minerals such as mica, kaolinite, etc., metal halides, such as sodium chloride, potassium chloride, etc.; metal acetates, such as those of sodium, potassium, calcium, etc. In certain instances, the filler may be the component of the initial composition which is removed during formation of the sheet product. In other instances, the filler is intended to remain as part of the finished sheet product. In the former case, the filler should be selected from material(s) which are readily removed by a liquid which is a non-solvent for the remaining desired sheet product components. In the later case, the filler should be selected from material(s) which are inert with respect to the battery environment for which its use is contemplated. Thus, alkali insoluble fillers are useful in sheet products contemplated for use in alkaline environments while acid insoluble materials are to be used in sheet products contemplated for use in acidic environment. In most instances, water-soluble materials will act as the (or one of the) removable components.

In addition, the initial composition can contain a material (normally a high boiling point liquid) which is capable of plasticizing the polymer under the conditions of sheet formation. Such materials can be water soluble or insoluble. Insoluble materials include, for example, organic esters, phosphate esters, hydrocarbon materials such as petroleum oils, low molecular weight polymers and resins, such as polyisobutylene, polybutadiene and the like, tall oil, linseed oil and the like. Soluble materials include, for example, ethylene glycol, glycerol, alkyl phosphates and the like. Part or all of the plasticizer may be removed as a means of achieving porosity to the resultant sheet product. Normally, it is the plasticizer component which is removed, by extraction with an appropriate solvent, to provide porosity.

The composition may also contain other conventional components such as stabiliziers, antioxidants, colorants and the like.

The amount of each component used in forming the initial composition will depend on the desired composition of the final sheet product (or rib material) and the material contemplated for removal during formation in order to achieve porosity of the structure. Normally, when the initial composition is composed of polymer, filler and plasticizer (with plasticizer capable of being removed) the amount of each component ranges from about 5 to 40 vol. percent polymer, 10 to 40 vol. percent filler and remainder of plasticizer. Normally, plasticizer forms about 50 to 75 vol. percent of the initial composition and the polymer to filler volume ratio is from 1:20 to 1:1. The end sheet product would thus have from about 3 to 50 vol. percent (preferably 5 to 15) polymer; from about 97 to 50 vol. percent (preferably 95 to 80) filler and from about 0 to 15 vol. percent (preferably 3 to 10) remaining plasticizer.

In the preferred embodiment of forming a sheet product useful as an acid battery separator, the preferred initial composition is composed of a polyolefin alone or admixed with small amounts of other polymers, as described above, silica and a liquid such as a petroleum oil or the like, or low melting solid, such as low molecular polymer or the like, capable of plasticizing the polyolefin under conditions of sheet formation.

Within this preferred embodiment, the preferred polyolefins are a polyethylene or polypropylene having a molecular weight of from about 150,000 to 5,000,000 and mixtures of such polymers. The polymer may be a homopolymer or co-polymer with other olefinic monomeric units. Further, the polyolefin may contain minor amounts of other polymeric material such as polymethacrylates and the like.

The following description is directed to producing a sheet product for which the base sheet and the rib projections are formed of the same composition. Sheet products formed from a base sheet and rib projections of dissimilar material or by subsequent application of rib material, can also produce the present T shaped ribbed sheet product using the appropriate steps of the description made herein below.

The components forming the initial composition are mixed together into a uniform mixture by any conventional means such as a blender or the like. The initial composition is then molded or shaped by conventional methods, such as extrusion, calendaring, injection molding, compression molding or the like to provide a sheet composed of a base sheet having spaced projections extending substantially perpendicular from one of the major surfaces of the base sheet. The projections are spaced from each other and can have a cross-sectional area which is substantially a quadrilateral parallelogram, such as, substantially rectangular or, alternately of a tapered cross-sectional area with the extended end being thinner than the portion connected to base sheet. Such a ribbed sheet can be formed according to the method described in U.S. Pat. Nos. 3,917,772; and 3,798,294; the teachings of which are incorporated herein by reference. In such a process, the initial composition is heated to provide a mass which is extrudable through a slit die into a plain sheet which is then passed between calendaring rolls. At least one of the rolls has a plurality of grooves separated by lands, all spaced around or across the roll. Depending on the desired rib configuration, the grooves may be evenly spaced or of other patterns and they may be linear (straight), sinusoidal or of other pattern. The grooves or channels should be of a depth which provides the resultant sheet with projections which are in excess of the desired height of the ribs of the final sheet product. The depth of the grooves are normally from about 20 to 90 mils. As the extruded sheet passes between the calendar rolls, the thickness of the base sheet is adjusted to that desired (the gap between the surface of one roller and the lands of the grooved roller. Excess material is forced into the grooves and thus provides a sheet with spaced, substantially perpendicular (with respect to the sheet's surface) ribs or projections on one surface of the base sheet. Between adjacent ribs is a substantially planar land area of the base sheet. Calendar rollers having different groove dimensions and shapes provide the projections initial shape (cross-section and height). This initial shape must be substantially simple and straight to be able to be readily removed from the forming means, such as a calendar roll surface, without tearing or causing other defects to the sheet. Conventionally, the above references teach that final height of the projections is made by brushing the top of the formed ribs against a sizing roll to remove excess height of the rib material. The sheet is then cooled and subjected to a means for removing at least one component of the initial mix (e.g. extraction) to provide porosity throughout the base sheet and ribs.

In the present invention, the initially formed ribbed sheet is cooled so that the base sheet and ribs are at a sufficiently low temperature to resist plastic flow. (Below the temperature where the composition exhibits a sufficiently low viscosity to be capable of forming into different shapes). The particular temperature will depend on the nature of the polymeric component, the amount and type of plasticizer and of the ratio of polymer to filler. Generally, the ribbed sheet should be cooled to temperatures of from ambient to about 200° F. This can be done by passing the initially formed sheet over chilled rollers and/or by air contact or the like. For example, sheets formed from polyethylene, silica and a processing plasticizer for the polyethylene should be cooled to less than about 175° F. and preferably less than about 125° F.

The sheet with its extended ribs is subjected to pressing with a heated first plate, roller or the like contacting the extended portion of each rib on the one surface of the sheet. The opposite surface of the base sheet is, at the same time, maintained at a temperature below the composition's plastic flow, such as in contact with a substantially unheated second plate or the like. While heating the extended rib, the pressing action should be substantially downward and to a gap between the first and second plates or the like which is less than the total height of the base sheet and extended rib, as initially formed. This can be done by pressing ribbed sheets between plates with one unheated plate being in contact with the base sheet and a second heated plate being in contact with the extended portion of the ribs. Alternately, the pressing and heating/cooling can be done by passing the ribbed sheet between two plate members with a tapered gap (larger to smaller) from ingress to egress so as to cause a heating by the upper plate in contact with the ribs while cooling the base sheet by the lower plate while exerting a pressing force to the ribbed sheet. Other means will be obvious to the artisan.

The heated pressing means should be at a temperature which imparts sufficient heat to the extended rib material it is in contact with to cause it to have plastic flow and capability of deformation while being pressed. The temperature should be less than that which would cause degradation to the extended rib section. When used with respect to a polyolefin/filler/plasticizer sheet composition, the temperature should be at least about 300° F., preferably at least about 350° F. and most preferably between 350° and 450° F. The exact temperature for causing deformation of the extended rib section can be readily determined by conventional experimentation and will depend upon the composition of the sheet being deformed, the residence time of contact and the pressing force being applied.

The unheated pressing means in contact with the surface of the base sheet which does not have the ribs should be at a temperature to maintain the base sheet and a portion of the rib (on the opposite surface) structure adjacent to the base rib at a temperature below that which would permit plastic flow of the material.

While the base sheet and at least one extended rib are in contact with the heated and unheated pressing means, as described above, these means should move towards each other to a predetermined gap. The final gap should have a dimension which is substantially that of the desired thickness of the final sheet product with finished ribs. Further, the dimension should be at least of the thickness of the base sheet plus a portion of the extended rib but less than the total height of the base sheet and of the extended rib, as initially formed. Gaps of from about 5 to 20 mils, preferably from about 5-10 mils less than the total height provides good T-shaped ribs. Thus, the gap must be such that the heated mass of material at the extended portion of each rib provides sufficient mass required to extend laterally forming a "T" shaped cross-sectional rib configuration.

The resultant T-ribbed sheet is removed from the pressing means and allowed to cool to provide a sheet product having projections or ribs on one surface which have a T cross-sectional configuration; that is the ribs extend from one surface of the base sheet by a stem portion which is substantially perpendicular to the base sheet and, at the extended end of each stem portion have lateral projections which are substantially parallel to the extension of the base sheet. Each surface of the lateral projections may be of any desired shape such as flat, rounded or curved or the like. For example, the undersurface of the lateral projection (the surface closest to the base sheet) may be flat while the outer surface may be curved thus providing a crown to the outer surface (the surface away from the base sheet) of the overall lateral projection.

The sheet can then be subjected to a means for providing microporosity to the shaped sheet such as, for example, by extracting the plasticizer component from the shaped sheet to form the desired sheet product. The sheet product has microporosity throughout its entire body (base sheet and, where appropriate, rib projections), thus, providing low electrical resistivity within a battery; and exhibits increased strength and capability to maintain desired spacing and positioning of the electrode plates when in a battery as well as rigidity during the blocking step of battery assembly.

When the sheet product is formed from a base sheet which has rib material subsequently applied thereto, the base sheet may already have microporosity or may be non-porous and require removal of a component to impart microporosity. In either instance, the composition of the applied ribs should be capable of exhibiting plastic flow at elevated temperatures and stability with respect to shape, form and composition at battery operating conditions and temperatures and (preferably) be capable of having microporosity. The ribs once adhered to the base sheet can be subjected to the pressing means, as described above and, where applicable, to the subsequent removal of at least one component, as also described above, to provide microporosity to the rib mass and to the base sheet as well.

The present invention of providing a porous sheet product having T shaped ribs extending from one surface thereof can be formed under modifications and alternatives to the specific embodiments disclosed herein above without departing from the true spirit and scope of the invention.

What is claimed is:

1. A battery separator sheet product comprising a substantially porous base sheet having spaced projections extending from one major surface of the base sheet, each of said spaced projections composed of a stem portion extending from the major surface and substantially perpendicular thereto and two lateral bodies extending in opposite directions from the free end of each stem to provide projections having a substantially T-shaped cross-section.

2. The porous sheet product of claim 1 wherein the cross-section of the stem-portion of each projection tapers from the base sheet to its extended portion.

3. The porous sheet product of claim 1 wherein the cross-section of the stem-portion of each projection is substantially a quadrilateral parallelogram.

4. The porous sheet product of claim 1 wherein each lateral projection is substantially parallel to the base sheet.

5. The porous sheet product of claim 1 wherein both the base sheet and the projections are porous.

6. The porous sheet product of claim 1 wherein the porosity is microporous.

7. The porous sheet product of claim 5 wherein the porosity is microporous.

8. The porous sheet product of claim 1 wherein the base sheet is composed of a first composition and the spaced projections are composed of a second composition.

9. The porous sheet product of claim 5 wherein the base sheet is composed of a first composition and the spaced projections are composed of a second composition.

10. The porous sheet product of claim 1 wherein the base sheet and spaced projections are formed from the same composition.

11. The porous sheet product of claim 5 wherein the base sheet and spaced projections are formed from the same composition.

12. The porous sheet product of claim 10 wherein the sheet product is formed from about 3 to 50 vol. percent of polyolefin, from about 97 to 50 vol. percent of a filler selected from silica and from 0 to about 15 vol. percent of a plasticizer for said polymer.

13. The porous sheet product of claim 11 wherein the sheet product is formed from about 3 to 50 vol. percent of polyolefin, from about 97 to 50 vol. percent of a filler selected from silica and from 0 to about 15 vol. percent of a plasticizer for said polymer.

14. In an electrochemical cell having at least one positive electrode, at least one negative electrode, a separator membrane between adjacent electrodes of opposite charge and an electrolyte, the improvement comprises the separator membrane being the sheet product of claim 1.

15. In an electrochemical cell having at least one positive electrode, at least one negative electrode, a separator membrane between adjacent electrodes of opposite charge and an electrolyte, the improvement comprises the separator membrane being the sheet product of claim 3.

16. In an electrochemical cell having at least one positive electrode, at least one negative electrode, a separator membrane between adjacent electrodes of opposite charge and an electrolyte, the improvement comprises the separator membrane being the sheet product of claim 4.

17. In an electrochemical cell having at least one positive electrode, at least one negative electrode, a separator membrane between adjacent electrodes of opposite charge and an electrolyte, the improvement comprises the separator membrane being the sheet product of claim 6.

18. In an electrochemical cell having at least one positive electrode, at least one negative electrode, a separator membrane between adjacent electrodes of opposite charge and an electrolyte, the improvement comprises the separator membrane being the sheet product of claim 10.

19. In an electrochemical cell having at least one positive electrode, at least one negative electrode, a separator membrane between adjacent electrodes of opposite charge and an electrolyte, the improvement comprises the separator membrane being the sheet product of claim 12.

20. In an electrochemical cell having at least one positive electrode, at least one negative electrode, a separator membrane between adjacent electrodes of opposite charge and an electrolyte, the improvement comprises the separator membrane being the sheet product of claim 2.

21. In an electrochemical cell having at least one positive electrode, at lest one negative electrode, a separator membrane between adjacent electrodes of opposite charge and an electrolyte, the improvement comprises the separator membrane being the sheet product of claim 5.

22. In an electrochemical cell having at least one positive electrode, at least one negative electrode, a separator membrane between adjacent electrodes of opposite charge and an electrolyte, the improvement comprises the separator membrane being the sheet product of claim 7.

23. In an electrochemical cell having at least one positive electrode, at least one negative electrode, a separator membrane between adjacent electrodes of opposite charge and an electrolyte, the improvement comprises the separator membrane being the sheet product of claim 8.

24. In an electrochemical cell having at least one positive electrode, at least one negative electrode, a separator membrane between adjacent electrodes of opposite charge and an electrolyte, the improvement comprises the separator membrane being the sheet product of claim 9.

25. In an electrochemical cell having at least one positive electrode, at least one negative electrode, a separator membrane between adjacent electrodes of opposite charge and an electrolyte, the improvement comprises the separator membrane being the sheet product of claim 11.

26. In an electrochemical cell having at least one positive electrode, at least one negative electrode, a separator membrane between adjacent electrodes of opposite charge and an electrolyte, the improvement comprises the separator membrane being the sheet product of claim 13.

* * * * *